United States Patent [19]

Kröckert et al.

[11] Patent Number: 5,215,583

[45] Date of Patent: Jun. 1, 1993

[54] PROCESS FOR COLORING BUILDING MATERIALS

[75] Inventors: Bernd Kröckert, Wesel; Günter Linde, Krefeld, both of Fed. Rep. of Germany

[73] Assignee: Bayer Aktiengesellschaft, Fed. Rep. of Germany

[21] Appl. No.: 894,538

[22] Filed: Jun. 5, 1992

[30] Foreign Application Priority Data

Jun. 14, 1991 [DE] Fed. Rep. of Germany ....... 4119667

[51] Int. Cl.$^5$ .............................................. C04B 14/02
[52] U.S. Cl. .................................. 106/712; 106/456; 106/461; 106/464
[58] Field of Search ............... 106/712, 456, 461, 462, 106/463, 464

[56] References Cited

U.S. PATENT DOCUMENTS

| | | | |
|---|---|---|---|
| 4,277,288 | 7/1981 | Lawrence et al. | 106/309 |
| 4,946,505 | 8/1990 | Jungk | 106/712 |

*Primary Examiner*—Mark L. Bell
*Assistant Examiner*—Chris Gallo
*Attorney, Agent, or Firm*—Connolly & Hutz

[57] ABSTRACT

Building materials are colored with pigments, for example iron oxide pigments, in the form of granules produced from a suspension of one or more pigments wherein the suspension also contains 0.05 to 5% of soluble salts, based on pigment weight.

9 Claims, No Drawings

PROCESS FOR COLORING BUILDING MATERIALS

This invention relates to a process for coloring building materials with inorganic pigments in the form of granules.

BACKGROUND OF THE INVENTION

If they are to be given a colored finish, cement- and lime-bonded building materials, such as plasters, lime-sand bricks, fiber-reinforced cement parts or cast stones, more particularly roof tiles and paving setts and also flagstones, are generally colored with inorganic pigments. Thus, it is standard practice in the building industry to use iron oxides or iron oxide hydroxides as red, black, brown or yellow pigments, manganese oxides as brown-black pigments, chromium oxides as green pigments and titanium dioxides as white pigments. Further examples include carbon blacks as black pigments, nickel or chrome rutiles as yellow pigments and cobalt-containing spinels as blue and green pigments, copper-containing spinels as black pigments and mixed crystals of barium sulfate and barium manganate as blue pigments.

The pigments are normally used in powder form for coloring concrete products. In ground form, they have the advantage of ready dispersibility. The pigment powders are homogeneously distributed in concrete mixtures in a short time (up to a few minutes). The disadvantage of these fine powders is that they show unsatisfactory flow behavior and often agglomerate and form lumps during storage. This makes accurate dosing very difficult. Another disadvantage of certain powders is that they tend to emit dust.

It is known that these disadvantages can be avoided in the pigmenting of concrete products by using aqueous pastes or slurries instead of dry pigment powders. The use of these pastes or slurries, which contain from 30 to 70% by weight pigment, has never been entirely successful because the additional water content causes considerably higher transport costs, depending on the distance from the point of manufacture to the point of use. In addition, the large quantity of water supplied with the pastes or slurries cannot be processed in every concrete preparation. The content of organic chemicals can also be problematical.

Accordingly, the building materials industry has largely continued using dry pigment powders. Pigments in the form of microgranules have not hitherto been used because it was thought that granules would be less readily dispersible in concrete preparations. Poorly dispersible pigment agglomerates require much longer mixing times. With the short mixing times typically used in the building materials industry, speckles, streaks or color spots occur on the surface of the concrete due to poor pigment distribution. The coloring strength of the pigment cannot be developed, so that relatively large quantities of pigment have to be used for the same color intensity of the concrete product.

DE-C 3 619 363 describes pigment granules consisting essentially of pigment and one or more binder(s) promoting the dispersion of the pigment in the concrete for the coloring of concrete products. Suitable binders, which act as dispersion aids in the concrete, are said to be alkyl benzenesulfonate, alkyl naphthalenesulfonate, lignin sulfonate, sulfated polyglycol ethers, melamine/formaldehyde condensates, naphthalene/formaldehyde condensates, gluconic acid, salts of low molecular weight, partly esterified styrene/maleic anhydride copolymers and copolymers of vinyl acetate and crotonic acid. The percentage content of binder in the pigment is said to be preferably 2 to 6% by weight.

The dispersion aids mentioned act as plasticizers in concrete mixtures. They influence the water-to-cement ratio and act on the consistency of the concrete.

In the inorganic pigment itself, the binders added—as organic substances—represent foreign material.

According to DE-A 2 940 156, the inorganic starting pigment has a resin content of at least 20%. The distribution of corresponding granules in concrete is seriously complicated by the resin components of hydrophobicized agglomerates.

DE-C 3 918 694 describes a process for coloring building materials with inorganic pigments in the form of microgranules, in which compounds of B, Al, Si, Ti, Zn and Sn are added to the pigments. This addition naturally incurs costs.

Now, the problem addressed by the present invention was to provide a process for coloring building materials which would not have any of the described disadvantages of the prior art.

BRIEF DESCRIPTION OF THE INVENTION

An improved process for coloring building materials has been discovered wherein building materials are colored with pigments in the form of granules produced from a suspension of one or more pigments wherein the suspension also contains 0.05 to 5% by weight of soluble salts, based on pigment weight. Iron oxide pigments are the particularly preferred pigments.

DETAILED DESCRIPTION OF THE INVENTION

The problems of the prior art have been solved by a process for the coloring of building materials with inorganic pigments in the form of granules, the pigment granules being produced from a suspension of one or more pigments which have a content of soluble salts, based on pigment, of 0.05 to 5% by weight.

It has surprisingly been found that the small percentage of soluble salts stabilizes the granules sufficiently so that dust emission is prevented and the granules are free-flowing. It does not matter whether the salts are added to the pigments or are present therein from the production process.

The granules may be produced in the form of bead granules, for example in spray dryers or fluidized-bed dryers or granulators, or may be produced in the form of pellets in pan granulators, coating pans or comparable units known to the expert.

Pigments containing polyvalent cations of the transition metals are preferred. Pigments containing titanium dioxide, iron oxide, chromium oxide, manganese oxide and/or zinc oxide are particularly preferred, iron oxide pigments being most particularly preferred. However, good results are also obtained with mixed-phase pigments.

The readily soluble salts added in accordance with the invention are preferably used in quantities of 0.1 to 1% by weight, based on pigment. The cations preferably emanate from ions of the first two main groups of the periodic system of elements. The preferred anions are chloride, sulfate and phosphate.

It has been found that the granules according to the invention should not exceed a particle size dependent on the pigment. This is determined primarily by the apparent density of the granules which in turn is a measure of the porosity of the particles. In the case of spray granulation, porosity is in turn governed by the solids content of the pumpable starting suspension before drying which can vary considerably according to the shape and size of the pigment particles. A measure of the apparent density is the compacted bulk volume or compacted bulk weight defined in DIN 53 194 of August, 1957 (ISO-DIN 787).

The pigment granules used in the process according to the invention are distinguished by the fact that they do not disintegrate during determination of the compacted bulk weight. The granules according to the invention have a compacted bulk weight of preferably 0.5 to 2.5 g/cm$^3$ and, more preferably, 0.8 to 1.5 g/cm$^3$.

The particle size should not be too small because the fines smaller than about 50 $\mu$m—depending on the pigment properties—are responsible for the emission of dust from a dry powder. In addition, any increase in the fine component is accompanied by a deterioration in flow.

The granules obtained in accordance with the invention by spraying drying have an average particle size of 30 to 500 $\mu$m and preferably 100 to 300 $\mu$m; granules obtained by pan granulation preferably have an average particle size of 100 $\mu$m to 1 cm.

Pigment granules with this particle size are free-flowing powders which are stable to handling and which do not emit any dust so that they are particularly suitable for the coloring of building materials. In contrast to the disclosure of DE-C 3 619 363, the shear forces applied to the granules in concrete preparations are sufficient for complete pigment dispersion during the mixing cycle. Particularly good results are obtained with iron oxide pigments.

The compacted bulk weight of the granules can vary according to the pigment, the form in which and the quantity in which it is added and the water content of the suspension. Low compacted bulk weights lead to granules of poor stability while high compacted bulk weights lead to granules of poor dispersibility. The iron oxide black granules according to the invention preferably have compacted bulk weights of 0.8 to 1.4 g/cm$^3$ while iron oxide red pigment granules preferably have compacted bulk weights of 1.2 to 1.6 g/cm$^3$.

The granules used in accordance with the invention typically contain 0.1 to 4% by weight water. Depending on the fineness of the pigment and the shape of the particles, the water content can be higher without adversely affecting the flow properties of the granules.

The following Examples are intended to illustrate the process according to the invention without limiting it in any way.

In the Examples, the determination of flow as the flow time from a cup with a 4 mm hole at the bottom was correspondingly applied to the granules to be tested.

Dispersibility in concrete was tested by measuring coloring strength on prisms made with white cement using the following parameters: cement/quartz sand ratio 1:4, water/cement value 0.35, pigmenting level 1.2%, based on cement, mixer used from RK Toni Technik, Berlin, with a 5 l mixing bowl, model 1551, rotational speed 140 r.p.m. (batch: 500 g cement). After 30, 40, 50, 60, 70 and 80 s, 4 mixture samples (300 g) were removed and test specimens (5×10×2.5 cm) were produced therefrom under pressure (32.5N/mm$^2$).

Hardening of the test specimens: 24 h at 30° C./95% relative air humidity followed by drying for 24 h at 50° C. The color data were measured with a Hunterlab instrument (3 measuring points on top and 3 underneath, 24 measuring points per pigment mixture). The average values obtained are related to the sample with a mixing time of 80 s (final coloring strength=100%). The soluble salts were determined as well known in the art.

EXAMPLES

EXAMPLE 1

An aqueous suspension containing approx. 50% by weight Fe$_3$O$_4$ and 0.7% soluble salts, based on solids (Bayferrox ® 318, a product of Bayer AG), was applied to the distributor disk of a disk spray dryer under a pressure of 0.5 bar. From a natural-gas flat burner, the combustion gases entered the spray dryer at a temperature of 380° C. The exit temperature of the gases was 105° C.

Iron oxide black pigment in the form of mechanically stable granules with an average particle size of 100 $\mu$m and a residual moisture content of 0.5% by weight was obtained at a rate of 95 kg/h. The granules had a compacted bulk weight of 1.14 g/cm$^3$. Their flow behavior was very satisfactory. Testing for dispersibility in concrete prisms by measuring the development of coloring strength showed that the final coloring strength was reached after 50 seconds.

EXAMPLE 2

An aqueous suspension of iron oxide red (Bayferrox ® 130, a product of Bayer AG) having a solids content of 55% by weight and a content of soluble salts of 0.3%, based on solids, was sprayed into a spray dryer through a fountain nozzle under a pressure of 23 bar. The nozzle had a 1.2 mm orifice and the vortex chamber was 2.7 mm thick. The entry temperature was 280° C. and the exit temperature 140° C.

Iron oxide red pigment in the form of granules having an average particle size of 120 $\mu$m and a residual moisture content of 0.3% was obtained at a rate of 65 kg/h. The granules had a compacted bulk density of 1.28 g/cm$^3$. Their flow behavior was good. In the test for dispersibility in concrete, the final coloring strength was reached after 60 seconds.

EXAMPLE 3

An aqueous suspension containing approx. 38% by weight TiO$_2$ (material for Bayertitan R-FK-21, a product of Bayer AG) with no addition of organic plasticizer and 1.3% soluble salts, based on solids, was sprayed into a spray dryer through a hollow cone nozzle (spraying angle 30°, bore 1.1 mm) under a pressure of 2.5 bar. From a natural-gas flat burner, the combustion gases enter the spray dryer at a temperature of 450° C. The exit temperature of the gases was 135° C.

Titanium dioxide in the form of stable granules with an average particle size of 250 $\mu$m and a residual moisture content of 0.3% was obtained at a rate of 8 kg/h. Their flow behavior was good.

What is claimed is:

1. In an improved method of coloring building materials by incorporating therein inorganic pigments in the form of granules, the improvement comprises said pigments being granules produced from a suspension of one or more pigments, said suspension having a content of soluble salts of 0.05 to 5% by weight, based on pigment, and wherein the soluble salts comprise cations selected from the alkali and alkaline earth metals and anions which are chlorides, sulfates, phosphates or mixtures thereof.

2. A process as claimed in claim 1 wherein the content of soluble salts in the suspension is 0.1 to 1% by weight.

3. A process as claimed in claim 1 wherein the granules are obtained by spray drying the suspension.

4. A process as claimed in claim 1 wherein the granules are obtained by pan granulation of the suspension.

5. A process as claimed in claim 1 wherein the pigments are at least one selected from the group consisting of titanium dioxide, iron oxide, chromium oxide, manganese oxide and zinc oxide.

6. A process as claimed in claim 5 wherein the pigments are iron oxide pigments.

7. A process as claimed in claim 6 wherein the iron oxide pigments are iron oxide black granules having a tamped density of 0.8 to 1.4 g/cm$^3$.

8. A process as claimed in claim 6 wherein the iron oxide pigments are iron oxide red granules having a tamped density of 1.2 to 1.6 g/cm$^3$.

9. A process as claimed in claim 1 wherein the pigments comprise inorganic mixed-phase pigments.

* * * * *